US008827062B2

(12) United States Patent
Quehenberger

(10) Patent No.: US 8,827,062 B2
(45) Date of Patent: Sep. 9, 2014

(54) TORQUE TRANSMISSION UNIT

(75) Inventor: Johannes Quehenberger, Saalbach (AT)

(73) Assignee: Magna Powertrain AG & Co KG, Lannach (AT)

( * ) Notice: Subject to any disclaimer, the term of this patent is extended or adjusted under 35 U.S.C. 154(b) by 519 days.

(21) Appl. No.: 13/192,598

(22) Filed: Jul. 28, 2011

(65) Prior Publication Data
US 2012/0031725 A1 Feb. 9, 2012

(30) Foreign Application Priority Data
Aug. 4, 2010 (DE) .......................... 10 2010 033 347

(51) Int. Cl.
F16D 48/02 (2006.01)
F16D 25/0638 (2006.01)
(52) U.S. Cl.
CPC .... *F16D 25/0638* (2013.01); *F16D 2048/0212* (2013.01); *F16D 2048/0251* (2013.01); *F16D 48/02* (2013.01)
USPC ..................................... 192/85.31; 192/85.34
(58) Field of Classification Search
USPC ........... 192/85.24, 85.31, 85.41, 85.42, 85.32
See application file for complete search history.

(56) References Cited

U.S. PATENT DOCUMENTS

| 7,419,456 | B2 | 9/2008 | Knoblauch et al. | |
|---|---|---|---|---|
| 7,506,740 | B2 * | 3/2009 | Ronk et al. ................. | 192/84.91 |
| 2006/0116237 | A1 | 6/2006 | Knoblauch et al. | |
| 2006/0231368 | A1 * | 10/2006 | Brissenden et al. ...... | 192/85 AA |
| 2007/0243074 | A1 * | 10/2007 | Murakami et al. ............ | 417/213 |
| 2009/0038908 | A1 * | 2/2009 | Quehenberger et al. .... | 192/85 R |

FOREIGN PATENT DOCUMENTS

| AT | 008925 | 2/2007 |
|---|---|---|
| DE | 10255713 | 6/2004 |
| DE | 102007012491 | 9/2008 |
| EP | 0017194 | 10/1980 |
| JP | 03107620 | 5/1991 |
| WO | 2004/040158 | 5/2004 |
| WO | 2006/047806 | 5/2006 |
| WO | 2006/128637 | 12/2006 |
| WO | 2007/039084 | 4/2007 |
| WO | 2007/045329 | 4/2007 |

* cited by examiner

Primary Examiner — Richard M. Lorence
(74) Attorney, Agent, or Firm — Dickinson Wright PLLC

(57) ABSTRACT

A torque transmission unit having a friction clutch and a hydraulic actuation system. The hydraulic actuation system includes a stepped piston unit having a stepped piston which has a first piston section movable in a first pressure space and a second piston section movable in a second pressure space. The first pressure space and a portion of the second pressure space can be brought into fluid communication by means of an overflow line based on a position of the first piston section. The hydraulic actuation system also includes an actuation piston unit having an actuation piston that cooperates with the friction clutch. A third pressure space is associated with the actuation piston and is in fluid communication with the second pressure space via a pressure line.

19 Claims, 3 Drawing Sheets

TORQUE TRANSMISSION UNIT

CROSS-REFERENCE TO RELATED APPLICATIONS

Figure 2:
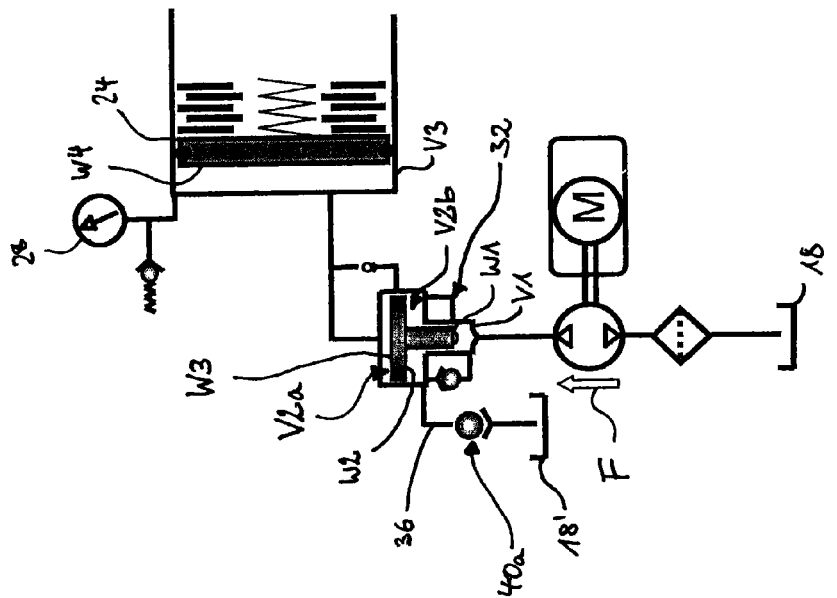

This application claims the benefit and priority of German Patent Application No. 10 2010 033 347.6, filed Aug. 4, 2010. The entire disclosure of the above application is incorporated herein by reference.

FIELD

The present disclosure relates to a torque transmission unit having a friction clutch and a hydraulic actuation system.

BACKGROUND

This section provides background information related to the present disclosure which is not necessarily prior art.

Torque transmission units are widely used in automotive engineering. Torque transmission units must reliably transmit the torque demanded in a respective situation, and must have reproducible performance features, even when the components of the torque transmission unit are subject to changes over time due to wear phenomena, for example. In other words, an actuation should have constant characteristics independently of the operating history of the torque transmission unit. Another important aspect is a fast reaction of the torque transmission unit to a corresponding demand signal.

SUMMARY

This section provides a general summary of the disclosure, and is not a comprehensive disclosure of its full scope or all of its features.

It is an object of the present disclosure to provide a reliable torque transmission unit that has short response times and substantially constant actuation characteristics over its life cycle.

The torque transmission unit of the disclosure includes a hydraulic actuation system with a stepped piston unit having a stepped piston defined by a first piston section and a second piston section. The first piston section is movable in a first pressure space and has a first hydraulically operative effective area while the second piston section is movable in a second pressure space and has second and third hydraulically operative effective areas. The first effective area is smaller than the second effective area. Furthermore, the first pressure space and a portion of the second pressure space associated with the second effective area can be brought into fluid communication by means of an overflow line dependent on a position of the first piston section.

In addition to the stepped piston unit, the hydraulic actuation system can include an actuation piston unit having an actuation piston that cooperates with the friction clutch to selectively effect an actuation of the torque transmission unit. A third pressure space is associated with the actuation piston and is in fluid communication—in particular permanently—with the second pressure space via a pressure line. The third pressure space can be brought into fluid communication with the portion of the second pressure space associated with the second effective area via a bypass line dependent on a position of the second piston section.

The stepped piston unit ensures that the response time of the torque transmission unit is short. If hydraulic liquid is supplied to the first pressure space, a movement of the stepped piston begins, which ultimately results in a movement of the actuation piston. As a rule, the actuation piston is not in a position that immediately results in an actuation of the friction clutch at the start of the actuation process. A specific path—for example a clearing distance—must frequently first be traveled through before the actuation piston actually effects an actuation of the friction clutch so that a significant torque transmission is made possible. This path should be traveled through as fast as possible, with only a small force having to be applied. For this purpose, the first piston section has a comparatively small first effective area. A supply of hydraulic fluid into the first pressure space, therefore, produces a fast—but not particularly powerful—movement of the stepped piston and of the actuation piston.

When the actuation piston starts to effect an engagement of the friction clutch, the priorities change and a larger force now has to be provided by the actuation piston instead of a fast movement. The overflow line is, therefore, provided that connects the first and second pressure spaces. A fluid communication is established between the two pressure spaces dependent on the position of the first piston section so that the hydraulic pressure present in the first pressure space now acts on the second effective area of the second piston section. Because the second effective area is larger than the first effective area, a larger force is exerted on the stepped piston by the hydraulic fluid, which in turn results in a more powerful application of force on the actuation piston.

In other words, a two-state force-travel characteristic of the actuation movement of the actuation piston is produced by the stepped piston unit that initially allows a fast traveling through of a "dead space" and that subsequently changes into a more powerful actuation movement that effects an actuation of the friction clutch.

A wear compensation of the torque transmission unit is achieved in that the actuation piston is kept constant in its zero point position with respect to the components of the friction clutch to be actuated. That is, the "dead space" to be traveled through initially is kept at the same magnitude. The readjustment of the zero point position of the actuation piston is made possible in that the third pressure space associated with the actuation piston can selectively be brought into a fluid communication with the portion of the second pressure space associated with the second effective area. This makes it possible to readjust the quantity of hydraulic fluid in the portion of the second pressure space associated with the third effective surface, in the pressure line and in the third pressure space, which takes place automatically in line with demand on a suitable design of the participating components. This kind of wear compensation, in combination with a stepped piston unit, can be realized in a simple manner and reliably delivers the desired results.

In accordance with an embodiment of the torque transmission unit, the second effective area is smaller than the third effective area to produce a suitable "translation" of the hydraulic fluid pressure provided to the actuation system into a movement of the actuation piston. Furthermore, the third effective area can be smaller than a fourth hydraulically operative effective area, which is formed at the actuation piston. A coordination of the magnitudes of the hydraulically operative areas of the different effective areas allows an adaptation of the force-travel characteristic of the actuation piston to the respective demands present.

A return line can be provided that connects the first pressure space and a portion of the second pressure space associated with the second effective area. Alternatively or additionally, a suction line can be provided that connects a hydraulic fluid reservoir and the portion of the second pressure space associated with the second effective area. At least one check valve can be arranged in at least one of the bypass line, the return line and the suction line.

A simple control of the torque transmission unit can be achieved when the first pressure space is in fluid communication with a reversible pump by means of which hydraulic fluid can be supplied to the pressure space and by means of which hydraulic fluid can be removed from the pressure space.

A pressure sensor can be provided for detecting the hydraulic fluid pressure present in the third pressure space so that the force that is applied to the actuation piston can be determined. A pressure restricting valve can be associated with the third pressure space by which hydraulic fluid can escape from the third pressure space when a predetermined pressure level in its interior is exceeded. The maximum force for actuating the friction clutch provided by the actuation piston is also restricted by the pressure restriction. The pressure restricting valve can also be variably adjustable—depending on the type of demands made on the torque transmission unit.

A control apparatus can be provided that is designed such that the pump and/or the pressure restricting valve can be controlled in dependence on signals of the pressure sensor.

In accordance with a further embodiment, the pressure restricting valve is arranged at an upper end of the third pressure space—in the installation position of the torque transmission unit—to allow a venting of the third pressure space as complete as possible.

The friction clutch can be a multi-disk clutch having a disk packet formed by a plurality of interleaved disks, with the disks being able to be brought into friction locking by a movement of the actuation piston. The actuation piston in particular acts directly on the disk packet in an actuation process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1-6 are schematic representations of different operative states of an embodiment of the torque transmission unit in accordance with the invention.

Corresponding reference numerals indicate corresponding parts throughout the several views of the drawings.

DETAILED DESCRIPTION

Example embodiments will now be described more fully with reference to the accompanying drawings.

Figure 1:
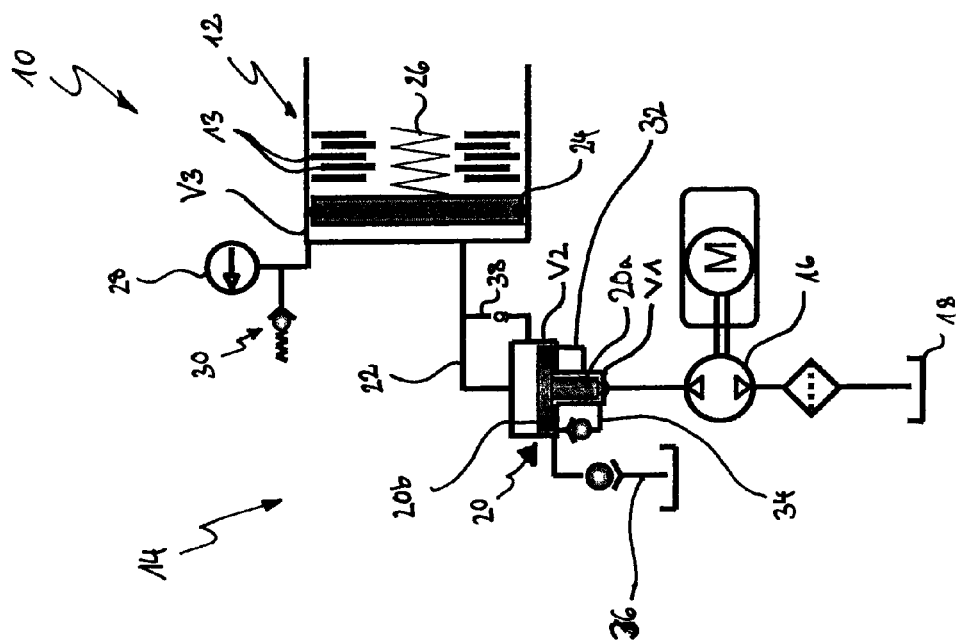

FIG. 1 shows a torque transmission unit 10 in accordance with the present disclosure with a friction clutch that includes a multi-disk clutch 12 having a plurality of interleaved disks 13. The multi-disk clutch 12 can be actuated with the aid of a hydraulic actuation system 14.

The actuation system 14 includes a motor M which drives a reversible pump 16 to deliver hydraulic fluid for actuating the multi-disk clutch 12 from a sump 18 to the actuation system 14. If the multi-disk clutch 12 is to be released, the pump 16 is operated in the opposite direction so that the hydraulic fluid is conveyed out of the actuation system 14 into the sump 18.

The actuation system 14 includes a stepped piston 20 which has two piston sections 20a, 20b. The first piston section 20a is arranged in a first pressure space V1 while the second piston section 20b is arranged in a second pressure space V2. The first piston section 20a includes a first hydraulically operative effective area W1 while the second piston section 20b includes second and third hydraulically operative effective areas W2 and W3, respectively. The pressure space V1 is in direct hydraulic communication with the pump 16. The second pressure space V2, in contrast, is in communication with a third pressure space V3 via a pressure line 22. An actuation piston 24 is arranged in the third pressure space V3. On a pressure increase in the third pressure space V3, the actuation piston 24 is moved to the right against the action of a lifting spring 26 of the multi-disk clutch 12. Initially, only the force applied by the lifting spring 26 has to be overcome in this respect. Only when this region known as a "clearing distance" has been traveled through, does a friction locking start to be formed between the disks 13 of the multi-disk clutch 12. More force now has to be applied in comparison with the traveling through of the clearance distance to press the disks 13 toward one another and thus to enable an effective torque transmission.

The pressure present in the third pressure space V3 is measured by a pressure sensor 28. Corresponding data can be forwarded to a control unit, not shown, which controls the motor M in dependence on these signals and on a torque demand.

Furthermore, a pressure relief or restricting valve 30 is associated with the third pressure space V3 and opens at a predetermined pressure to prevent the hydraulic pressure in the third pressure space V3 from becoming too high. The pressure relief valve 30 can also be a variably adjustable valve whose opening pressure is selectable and which can, in particular, be predefined by the control unit.

In addition to the above-described components of the torque transmission unit 10, the hydraulic actuation system 14 includes an overflow line 32, a return line 34, a suction line 36 and a bypass line 38 whose importance will be explained in the following with reference to a description of the mode of operation of the torque transmission unit 10.

A base state of the torque transmission unit 10 is shown in FIG. 1. The actuation piston 24 is located in a zero point position and the multi-disk clutch 12 does not transmit any torque since its disks 13 are released ("cleared") from one another. To actuate the multi-disk clutch 12, the motor M is put into operation (FIG. 2) to convey hydraulic fluid into the third pressure space V3 and thus to urge the actuation piston 14 toward the disks 13 of the clutch 12. The conveying direction of the pump 16 is marked by the arrow F.

The hydraulic fluid conveyed by the pump 16 flows into the first pressure space V1 and acts on the first effective area W1 of the first piston section 20a, whereby the second piston section 20b is also moved with the third effective area W3 into the pressure space V2. Hydraulic fluid is conveyed by the movement of the third effective area W3 from an outer or first part volume V2a of the second pressure space V2 via the pressure line 22 to the third pressure space V3. The hydraulic pressure increases there and the actuation piston 24 is pressed toward the disks 13.

An inner or second part volume V2b of the second pressure space V2 is produced by the movement of the second piston section 20b in the second pressure space V2 and is filled with hydraulic fluid from a sump 18' via the suction line 36 which is provided with a first check valve 40a.

In the situation shown in FIG. 2, the actuation piston 14 has already traveled through the clearing distance of the multi-disk clutch 12 and contacts the disk packet. Since only the force applied by the lifting spring 26 essentially has to be overcome during the traveling through of the clearing distance, it is sufficient if the first effective area W1 is relatively small. The volume of the first pressure space V1 can therefore likewise be relatively small so that, with a given pumping power of the pump 16, a relatively fast movement of the stepped piston 20 and thus of the actuation piston 24 is effected. To generate a reliable friction locking of the disks 13, a higher force has to be applied after traveling through the clearing distance. For this purpose, the overflow line 32 is released by the first piston section 20a, whereby a fluid communication is established between the first pressure space V1 and the second part volume V2b of the second pressure space V2. The first check valve 40a closes due to the pressure present in the second part volume V2b. The hydraulic fluid conveyed by the pump 16 now acts on the second effective area W2 of the second piston section 20b. Since the second effective area W2 is larger than the first effective area W1, the stepped piston 20 is now urged upwardly more strongly, which has the consequence that the actuation piston 24 is also pressed more strongly toward the disks 13 than before. The force acting on the disks 13 can be controlled by the adaptation of the pumping power of the pump 16 in dependence on the torque demand and on the hydraulic pressure values measured by the pressure sensor 28 in the interior of the third pressure space V3.

It is understood that the ratio of the effective areas W1, W2 is decisive for how fast the stepped piston 20 is moved on a given pumping power of the pump 16 and thus also the actuation piston 24 is moved. It is likewise understood that the ratio of the areas W1, W2 also determines the ratio of the actuation force applied during the individual phases of the actuation. In this respect, the specific magnitudes of the effective surfaces W1, W2 are not of decisive importance, but only their ratio. The stepped piston 20 can, therefore, be made as small as desired in diameter. The distances to be traveled, however, become longer with smaller piston diameters, but then the accuracy of the positioning of the coupling of the overflow line 32 to the first pressure space V1—the position of the coupling ultimately defines the clearing distance—has less influence on the accuracy of the total system.

The dimensioning of the third effective area W3 as well as of an a fourth effective area W4 associated with the actuation piston 24 is furthermore of influence for the force exerted on the disks 13. A matching of the effective areas W1, W2, W3, W4 allows the generation of the desired actuation profile in a simple manner.

Figure 3:
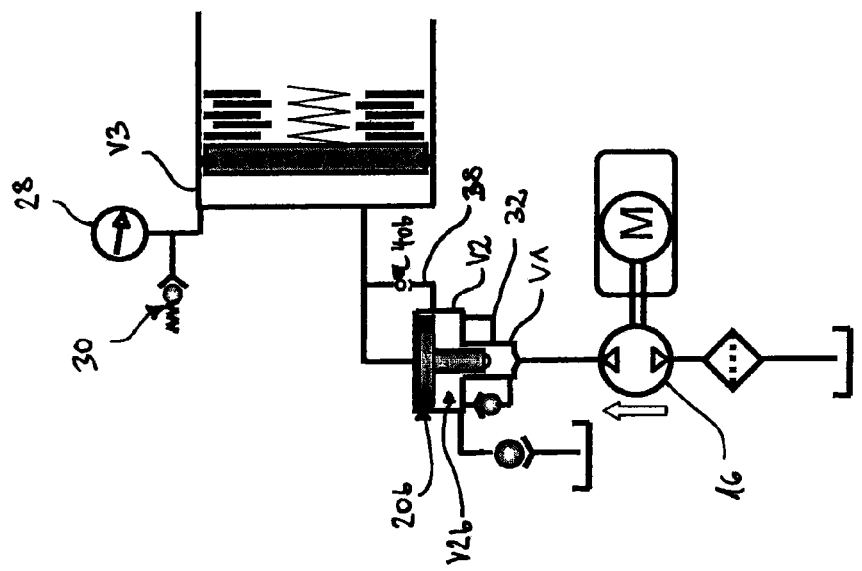

If, as shown in FIG. 3, the hydraulic pressure is further increased (see sensor 28), the stepped piston 20 moves until the second piston section 20b abuts an upper end of the second pressure space V2. In this situation, the bypass line 38 is released and the hydraulic fluid can be supplied from the pump 16 via the first pressure space V1, the overflow line 32, the second part volume V2b, the bypass line 38 having a second check valve 40b and the pressure line 22 directly to the third pressure space V3. When a predefined maximum pressure has been reached, the pressure restricting valve 30 opens and the hydraulic fluid can escape into a further sump, not shown. A first filling of the hydraulic actuation system 14 can be carried out in the described manner and/or the system 14 can be vented. Since the pressure relief valve 30 is arranged at the topmost point in the installation position of the torque transmission unit 10, any air which may be present in the system 14 can be effectively removed.

Figure 4:
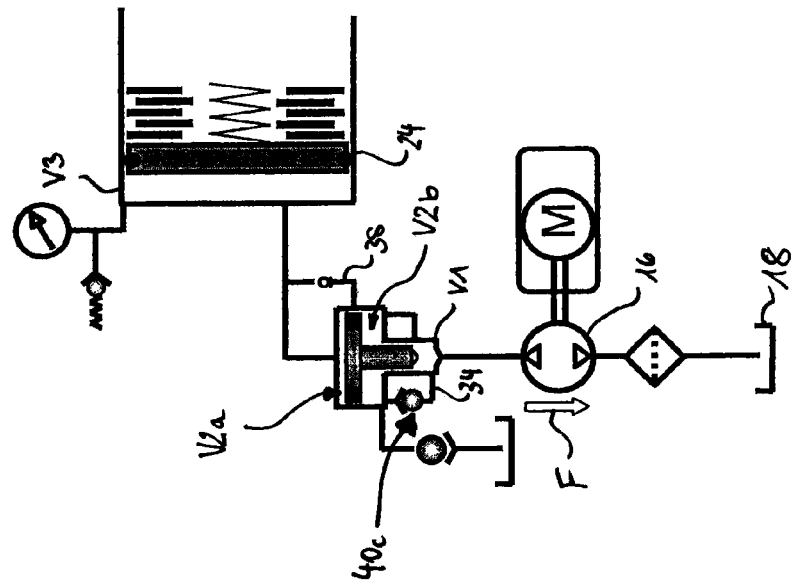

FIG. 4 shows the situation which arises when the multi-disk clutch 12 should be released again. For this purpose, the conveying direction F is reversed and the pump 16 sucks hydraulic fluid out of the first pressure space V1. The stepped piston 20 is retracted and thereby moves downwardly. The movement of the stepped piston 20 has the result that the bypass line 38 is closed, provided this was actually previously open, which only happens, as a rule, on a filling, a venting and/or a wear compensation. Hydraulic fluid can no longer escape from the hydraulic system between the third pressure space V3 and the first part volume V2a. An increase in the first part volume V2a consequently "pulls" the actuation piston 24 to the left and the clutch 12 is released.

As long as the overflow line 32 has not yet been closed by the first piston section 20a, the second part volume V2b is emptied via the overflow line 32. If the overflow line 32 is, however, again blocked by the first piston section 20a, the hydraulic fluid flows out of the second part volume V2b via the return line 34 which is provided with a third check valve 40c into the first pressure space V1 (see FIG. 5).

Figure 6:
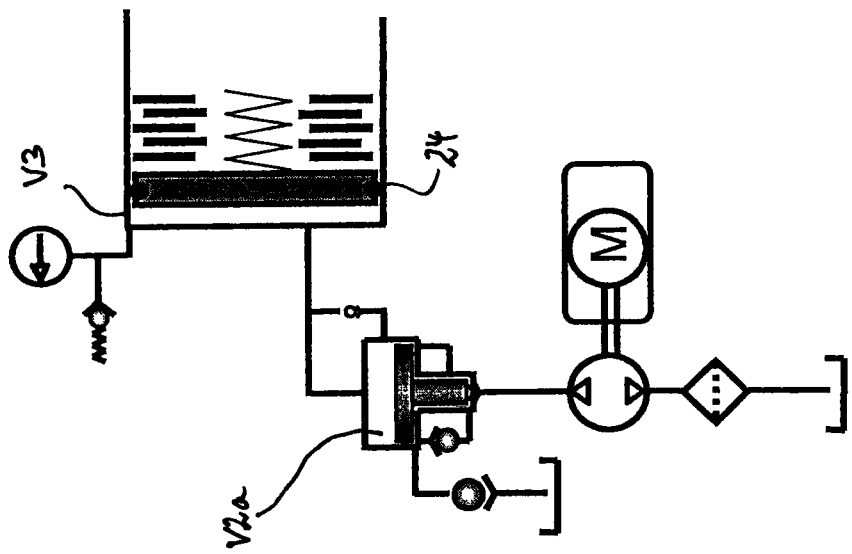
Figure 5:
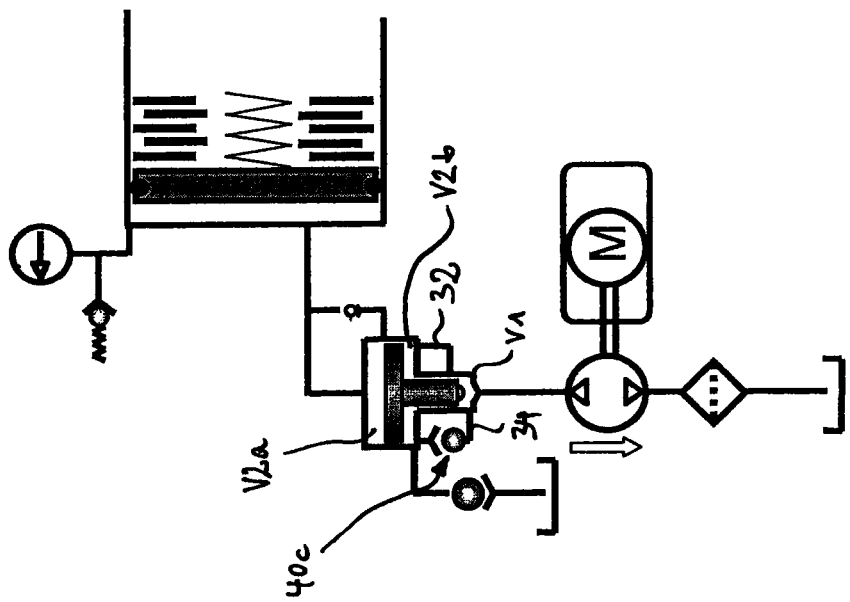

When the stepped piston 20, as shown in FIG. 6, has reached its lower abutment, the actuation piston 24 also no longer moves. The actuation piston 24 thus does not require any mechanically defined end abutment. The zero point position of the actuation piston 24 is rather defined by the quantity of hydraulic fluid in the above-named part region of the actuation system 14. If, for example, the disks 13 of the clutch 12 become thinner due to abrasion, an increasingly longer clearing distance would have to be traveled through with a torque transmission unit without wear compensations—for instance, with a fixed end abutment of the actuation piston 24—before a friction locking occurs between the disks 13, which has a disadvantageous effect on the actuation dynamics. The torque transmission unit 10, in contrast, has a "hydraulic abutment" which is formed by the quantity of the hydraulic fluid present in the third pressure space V3 and in the first part volume V2a of the second pressure space V2. The effects of wear phenomena of the clutch 12 can be compensated by an adaptation of this hydraulic fluid quantity. It is only necessary for this purpose to load the clutch 12 to a maximum so that the bypass line 38 is opened. The quantity of the hydraulic fluid in the named part of the actuation system 14 can now be increased via the line 38. On the opening of the clutch 12, the actuation piston 24 is only retracted so much as is defined by the design of the stepped piston 20 and the pressure spaces V1, V2 associated with it. Since these components are not subject to any relevant wear, the actuation piston 24 is always traveled to the left by the same amount, which corresponds exactly to the predefined clearing distance. A reliable wear readjustment is thus automatically carried out on every venting process by the above-described procedure.

The lower abutment of the stepped piston 20 is defined, for example, by the effective area W1 or W2. The abutment can simultaneously be designed as a sealing seat. A part of the lower end of the first piston section 20a is formed as a circular segment which symbolizes this sealing seat in FIGS. 1 to 6. It is ensured by this sealing seat and the sealing seats of the check valves 40a, 40b, 40c that the hydraulic fluid volume and the hydraulic fluid pressure which holds the actuation piston 34 at the desired position are also not lost over longer periods of time.

It can be stated in summary that the actuation system 14 allows a fast response of the torque transmission unit 10, starting from a lifted state of the clutch 12. Since the clearing distance can be traveled through fast, it can be very long, which allows a better lifting of the clutch 12. Clutches having a comparatively long clearing distance as a rule transmit a smaller basic torque (a usually unwanted torque transmission in the open state of the clutch) than comparable clutches with a shorter clearing distance. They are therefore particularly suited for a use in torque vectoring systems or in disconnect systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A torque transmission unit having a friction clutch and a hydraulic actuation system, comprising:
   a stepped piston unit including a stepped piston, the stepped piston having a first piston section having a first hydraulically operative effective area that is movable in a first pressure space, and a second piston section having second and third hydraulically operative effective areas that is movable in a second pressure space, wherein the first effective area is smaller than the second effective area, and the first pressure space and a portion of the second pressure space associated with the second effective area are operable to be brought into fluid communication by an overflow line based on a position of the first piston section; and
   an actuation piston unit including an actuation piston that cooperates with the friction clutch in order to selectively effect an actuation of the torque transmission unit, the actuation piston being associated with a third pressure space that is in fluid communication with the second pressure space via a pressure line, the third pressure space operable to be brought into fluid communication with the portion of the second pressure space associated with the second effective area based on a position of the second piston section via a bypass line.

2. The torque transmission unit in accordance with claim 1, wherein the third pressure space is permanently in fluid communication with the second pressure space via the pressure line.

3. The torque transmission unit in accordance with claim 1, wherein the second effective area is smaller than the third effective area.

4. The torque transmission unit in accordance with claim 1, wherein the third effective area is smaller than a fourth hydraulically operative effective area that is formed at the actuation piston.

5. The torque transmission unit in accordance with claim 1, further comprising a return line that connects the first pressure space and the portion of the second pressure space associated with the second effective area.

6. The torque transmission unit in accordance with claim 5, further comprising a suction line that connects a hydraulic fluid reservoir and the portion of the second pressure space associated with the second effective area, wherein a check valve is arranged in at least one of the bypass line, the return line, and the suction line.

7. The torque transmission unit in accordance with claim 1, further comprising a suction line that connects a hydraulic fluid reservoir and the portion of the second pressure space associated with the second effective area.

8. The torque transmission unit in accordance with claim 1, wherein the first pressure space is in fluid communication with a reversible pump that is operable to supply hydraulic fluid to the first pressure space and is operable to remove hydraulic fluid from the first pressure space.

9. The torque transmission unit in accordance with claim 8, further comprising: a pressure sensor for detecting a hydraulic fluid pressure present in the third pressure space; a pressure restricting valve associated with the third pressure space operable to allow hydraulic fluid to escape from the third pressure space when a predefined pressure level is exceeded; and a control device operable to control at least one of the pump and the pressure restricting valve based on signals of the pressure sensor.

10. The torque transmission unit in accordance with claim 1, further comprising a pressure sensor for detecting a hydraulic fluid pressure present in the third pressure space.

11. The torque transmission unit in accordance with claim 1, further comprising a pressure restricting valve associated with the third pressure space operable to allow hydraulic fluid to escape from the third pressure space when a predefined pressure level is exceeded.

12. The torque transmission unit in accordance with claim 11, wherein the pressure restricting valve is arranged at an upper end of the third pressure space to allow a venting of the third pressure space.

13. The torque transmission unit in accordance with claim 1, wherein the friction clutch is a multi-disk clutch having a disk packet formed by a plurality of disks, and wherein the disks can be brought into friction locking by a moving of the actuation piston against the disk packet.

14. The torque transmission unit in accordance with claim 13, wherein the actuation piston acts directly on the disk packet.

15. A torque transmission unit, comprising:
    a friction clutch; and
    a hydraulic actuation system for actuating the friction clutch, the hydraulic actuation system including a reservoir of hydraulic fluid, a pump for pumping the hydraulic fluid to and from the reservoir, a motor for driving the pump, and a stepped piston unit having a first pressure space in fluid communication with the pump, and a second pressure space and a stepped piston with a first piston section movable in the first pressure space and a second piston section movable in the second pressure space, wherein the first piston section has a first effective area and the second piston section has second and third effective areas such that the first effective area is smaller than the second effective area, the hydraulic actuation system also includes an overflow line providing selective fluid communication between the first pressure space and a portion of the second pressure space associated with the second effective area based on a position of the first piston section in the first pressure space, an actuation piston unit having an actuation piston moveable within a third pressure space for selectively engaging the friction clutch, a pressure line providing fluid communication between the third pressure space and a portion of the second pressure space associated with the third effective area, and a bypass line providing selective fluid communication between the third pressure space and the portion of the second pressure space associated with the second effective area based on a position of the second piston section in the second pressure space.

16. The torque transmission unit of claim 15 wherein the hydraulic actuation system further includes a return line that connects the first pressure space and the portion of the second pressure space associated with the second effective area of the second piston section, a suction line that connects the hydraulic reservoir and the portion of the second pressure space associated with the second effective area of the second piston section, and a pressure restricting valve for limiting the fluid pressure in the third pressure space.

17. The torque transmission of claim 16 wherein the hydraulic actuation system further includes a first check valve arranged in the suction line and operable to only permit fluid flow from the hydraulic reservoir to the portion of the second pressure space associated with the second effective area, a second check valve arranged in the bypass line and operable to only permit fluid flow from the second pressure space to the third pressure space, and a third check valve disposed in the return line and operable to only permit fluid flow from the second pressure space to the first pressure space.

18. A torque transmission unit, comprising
a friction clutch;
a hydraulic actuation system for actuating the friction clutch, the hydraulic actuation system including a reservoir of hydraulic fluid, a pump for pumping the hydraulic fluid to and from the reservoir, a motor for driving the pump, and a stepped piston unit having a first pressure space in fluid communication with the pump, and a second pressure space and a stepped piston with a first piston section movable in the first pressure space and a second piston section movable in the second pressure space, wherein the first piston section has a first effective area and the second piston section has second and third effective areas such that the first effective area is smaller than the second effective area, the hydraulic actuation system also includes an overflow line providing selective fluid communication between the first pressure space and a portion of the second pressure space associated with the second effective area based on a position of the first piston section in the first pressure space, an actuation piston unit including an actuation piston moveable within a third pressure space for selectively engaging the friction clutch, a pressure line providing fluid communication between the third pressure space and a portion of the second pressure space associated with the third effective area, a bypass line providing selective fluid communication between the third pressure space and the portion of the second pressure space associated with the second effective area based on a position of the second piston section in the second pressure space, a pressure sensor for detecting a hydraulic fluid pressure present in the third pressure space, and a pressure restricting valve associated with the third pressure space and operable to allow hydraulic fluid to escape from the third pressure space when a predefined pressure level is exceeded; and
a control device operable to control at least one of the pump and the pressure restrictive valve based on signals of the pressure sensor.

19. The torque transmission unit of claim 18 wherein the hydraulic actuation system further includes a return line that connects the first pressure space and the portion of the second pressure space associated with the second effective area of the second piston section, a suction line that connects the hydraulic reservoir and the portion of the second pressure space associated with the second effective area of the second piston section, a first check valve arranged in the suction line and operable to only permit fluid flow from the hydraulic reservoir to the portion of the second pressure space associated with the second effective area, a second check valve arranged in the bypass line and operable to only permit fluid flow from the second pressure space to the third pressure space, and a third check valve disposed in the return line and operable to only permit fluid flow from the second pressure space to the first pressure space.

\* \* \* \* \*